(12) United States Patent
Mizusaki et al.

(10) Patent No.: US 12,484,456 B2
(45) Date of Patent: Nov. 25, 2025

(54) SPIN ORBIT TORQUE MAGNETIC MEMORY DEVICES, OPERATING METHODS THEREOF, AND ELECTRONIC APPARATUSES INCLUDING THE MAGNETIC MEMORY DEVICES

(71) Applicant: Samsung Electronics Co., Ltd., Suwon-si (KR)

(72) Inventors: Soichiro Mizusaki, Suwon-si (KR); Kwangseok Kim, Suwon-si (KR); Jeongchun Ryu, Suwon-si (KR); Atsushi Okada, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 96 days.

(21) Appl. No.: 18/178,103

(22) Filed: Mar. 3, 2023

(65) Prior Publication Data

US 2024/0147868 A1    May 2, 2024

(30) Foreign Application Priority Data

Oct. 28, 2022    (KR) .................. 10-2022-0141765

(51) Int. Cl.
*H10N 50/10* (2023.01)
*G11C 11/16* (2006.01)
(Continued)

(52) U.S. Cl.
CPC .......... *H10N 50/10* (2023.02); *G11C 11/161* (2013.01); *H01F 10/3272* (2013.01);
(Continued)

(58) Field of Classification Search
CPC ........ H10N 50/10; H10N 50/01; H10N 50/80; H10N 50/85; G11C 11/161; G11C 11/16;
(Continued)

(56) References Cited

U.S. PATENT DOCUMENTS 10,608,167 B2 *  3/2020  Nikonov ............... H03K 19/18
10,825,497 B2    11/2020  Kim et al.
(Continued)

FOREIGN PATENT DOCUMENTS

CN    112750855 A    5/2021
JP    6642680 B2    2/2020

OTHER PUBLICATIONS

Seungchul Jung et al., "A crossbar array of magnetoresistive memory devices for in-memory computing", Nature, vol. 601, pp. 211-216 (2022).
(Continued)

*Primary Examiner* — Allison Bernstein
(74) *Attorney, Agent, or Firm* — Harness, Dickey & Pierce, P.L.C.

(57) ABSTRACT

Disclosed are a spin orbit torque (SOT) magnetic memory device, an operating method thereof, and an electronic apparatus including the SOT magnetic memory device. The SOT magnetic memory device includes a first SOT layer, a magnetic tunnel junction (MTJ) layer on one surface of the first SOT layer, and an SOT-based local magnetic field generation layer to cross the first SOT layer and including a generating region configured to generate a magnetic field that reaches the MTJ layer; and an upper electrode layer disposed to face the first SOT layer with the MTJ layer therebetween and in contact with the MTJ layer. The SOT magnetic memory device includes five operating terminals.

20 Claims, 11 Drawing Sheets

(51) Int. Cl.
*H01F 10/32* (2006.01)
*H10B 61/00* (2023.01)
*H10N 50/01* (2023.01)
*H10N 50/80* (2023.01)
*H10N 50/85* (2023.01)

(52) U.S. Cl.
CPC .......... *H01F 10/329* (2013.01); *H10B 61/00* (2023.02); *H10N 50/01* (2023.02); *H10N 50/80* (2023.02); *H10N 50/85* (2023.02); *H01F 10/3254* (2013.01)

(58) Field of Classification Search
CPC . G11C 11/18; G11C 11/1675; G11C 11/1697; H01F 10/3272; H01F 10/329; H01F 10/3254; H10B 61/00
See application file for complete search history.

(56) References Cited

U.S. PATENT DOCUMENTS

| | | |
|---|---|---|
| 11,195,991 B2 | 12/2021 | Song et al. |
| 11,250,897 B2 | 2/2022 | Shiokawa et al. |
| 11,289,143 B2 | 3/2022 | Song et al. |
| 2014/0211552 A1 | 7/2014 | Pi et al. |
| 2017/0148978 A1 | 5/2017 | Apalkov et al. |
| 2018/0151212 A1 | 5/2018 | Lim et al. |
| 2021/0303981 A1* | 9/2021 | Sasaki .................. G06N 3/063 |
| 2022/0052254 A1 | 2/2022 | Ying et al. |
| 2022/0165320 A1 | 5/2022 | Chiang et al. |
| 2023/0086181 A1* | 3/2023 | Frougier ............ H01F 10/3254 365/158 |

OTHER PUBLICATIONS

Luqiao Liu et al., "Current-Induced Switching of Perpendicularly Magnetized Magnetic Layers Using Spin Torque from the Spin Hall Effect", Phys. Rev. Lett. PRL 109, 096602-096602-5 (2012).

Xiaonan Zhao et al., "Purely Electrical Controllable Complete Spin Logic in a Single Magnetic Heterojunction", Adv. Funct. Mater., 31, 2105359, pp. 1-6 (2021).

* cited by examiner

SPIN ORBIT TORQUE MAGNETIC MEMORY DEVICES, OPERATING METHODS THEREOF, AND ELECTRONIC APPARATUSES INCLUDING THE MAGNETIC MEMORY DEVICES

CROSS-REFERENCE TO RELATED APPLICATION

This application is based on and claims priority under 35 U.S.C. § 119 to Korean Patent Application No. 10-2022-0141765, filed on Oct. 28, 2022, in the Korean Intellectual Property Office, the disclosure of which is incorporated by reference herein in its entirety.

BACKGROUND

Various example embodiments relate to memory devices, and more particularly, to spin orbit torque (SOT) magnetic memory devices, operating methods thereof, and/or electronic apparatuses including the SOT magnetic memory devices.

A magnetic memory device writes and/or reads information by using a tunneling magnetoresistance (TMR) phenomenon. When the magnetic moment directions of two magnetic layers included in a magnetic tunnel junction (MTJ) of a magnetic memory device are parallel to each other, the magnetic memory device has low resistance, and when the magnetic moment directions are antiparallel to each other, the magnetic memory device has high resistance.

The MTJ includes two magnetic layers: a pinned layer in which a direction of a magnetic moment is fixed, and a free layer in which the direction of the magnetic moment may be switched.

An SOT magnetic memory, e.g., an SOT MRAM, uses a spin orbit torque for a write operation to determine a direction of a magnetic moment (direction of magnetization) of the free layer. To this end, the SOT MRAM includes an SOT layer under the MTJ, and instead of applying a write current through the MTJ, a current is applied to the SOT layer.

SUMMARY

Provided are SOT magnetic memory devices that do not include a separate magnetic field generating member outside a memory cell.

Alternatively or additionally, provided are SOT magnetic memory devices with increased degree of integration.

Alternatively or additionally, provided are SOT magnetic memory devices that may be synchronized with an external device.

Alternatively or additionally, provided are operating methods of the SOT magnetic memory device described above.

Alternatively or additionally, provided are electronic apparatuses including the SOT magnetic memory device described above.

Additional aspects will be set forth in part in the description which follows and, in part, will be apparent from the description, or may be learned by practice of the presented embodiments of the disclosure.

According to various example embodiments, a spin orbit torque (SOT) magnetic memory device may include a first SOT layer, a magnetic tunnel junction (MTJ) layer on one surface of the first SOT layer, an SOT-based local magnetic field generation layer crossing the first SOT layer and including a generating region configured to generate a magnetic field that reaches the MTJ layer, and an upper electrode layer disposed to face the first SOT layer with the MTJ layer therebetween and in contact with the MTJ layer. The SOT magnetic memory device includes five operating terminals.

In some example embodiments, the local magnetic field generation layer may include a first layer, and the first layer may include a magnetic SOT layer and/or a synthetic antiferromagnetic (SAF) layer.

In some example embodiments, the SOT magnetic memory device may further include a second layer between the first layer and the first SOT layer in the generating region. The first layer may include any one or more of a second SOT layer, a magnetic SOT layer, and a SAF layer, and the second layer may include any one or more of a magnetic layer, an insulating layer, and a SAF layer.

In some example embodiments, the SOT magnetic memory device may further include a third layer between the second layer and the first SOT layer in the limited region. The first layer may include a second SOT layer, the second layer may include a magnetic layer, and the third layer may include an insulating layer. The insulating layer may include an oxide.

In some example embodiments, the first SOT layer, the MTJ layer, the local magnetic field generation layer, and the upper electrode layer may form a memory cell, the SOT magnetic memory device may include a plurality of memory cells, and the first SOT layer may be shared by the plurality of memory cells. The first SOT layer may include at least one of W, Pt, Ta, and Hf.

In some example embodiments, the magnetic layer may include one of CoFeB, CoPt, CoPt multilayer, CoTbB, and CoMnSi.

According to various example embodiments, an operating method of a spin orbit torque (SOT) magnetic memory device including a magnetic tunnel junction (MTJ) layer, the operating method includes: forming a magnetic moment aligned in a first direction in a limited region of the SOT-based material layer spaced apart from the MTJ layer and generating a magnetic field reaching a free layer of the MTJ layer, and after forming the magnetic moment, supplying a spin current to the free layer of the MTJ layer in a state that the magnetic field is present.

In some example embodiments, the method may further include, after forming the magnetic moment by applying a first current to the SOT-based material layer, stopping the application of the first current before supplying the spin current.

In some example embodiments, the method may further include, after completing the supplying of the spin current, measuring a resistance of the MTJ layer, and comparing the measured resistance with a reference resistance.

In some example embodiments, the SOT-based material layer may include a magnetic SOT layer or a SAF layer.

In some example embodiments, the SOT-based material layer may include a first layer and a second layer sequentially stacked in the limited region, wherein the first layer may include any one of a non-magnetic SOT layer, a magnetic SOT layer, and a SAF layer, and the second layer may include any one of a magnetic layer, an insulating layer, and a SAF layer.

In some example embodiments, the SOT-based material layer may include first to third layers sequentially stacked in the limited region, wherein the first layer may include a non-magnetic SOT layer, the second layer may include a magnetic layer, and the third layer may include an insulating layer.

According to various example embodiments, an electronic apparatus includes a memory device, and the memory device includes the SOT magnetic memory device according to various example embodiments described above.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
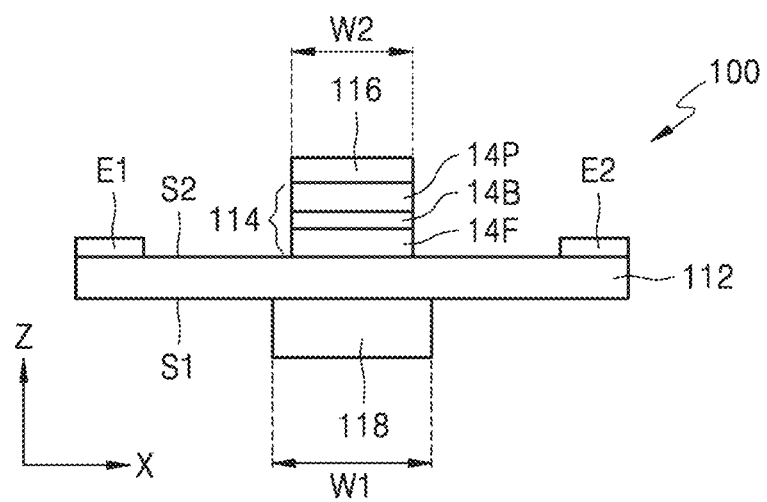
FIG. 1 is a cross-sectional view showing an SOT magnetic memory device according to various example embodiments.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, "at least one of a, b, and c" may be understood to include "only a," "only b," "only c," "a and b," "a and c," "b and c," or "a, b, and c". When the terms "about" or "substantially" are used in this specification in connection with a numerical value, it is intended that the associated numerical value includes a manufacturing or operational tolerance (e.g., ±10%) around the stated numerical value. Moreover, when the words "generally" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes.

Hereinafter, an SOT magnetic memory device, an operating method thereof, and an electronic apparatus including the magnetic memory device, according to various example embodiments will be described in detail with reference to the accompanying drawings. In the drawings, thicknesses of layers and regions may be exaggerated for clarification of the specification. The embodiments of the disclosure are capable of various modifications and may be embodied in many different forms. In addition, when an element or layer is referred to as being "on" or "above" another element or layer, the element or layer may be directly on another element or layer or intervening elements or layers. In the following descriptions, like reference numerals refer to like elements.

FIG. 1 shows a unit magnetic memory device 100 provided at a crossing point of a spin orbit torque magnetic random access memory (SOT-MRAM) according to various example embodiments. The unit magnetic memory device 100 may be expressed as a unit magnetic memory cell. Bit data such as "0" or "1" may be recorded in the magnetic memory device 100.

Referring to FIG. 1, the magnetic memory device 100 includes a first SOT layer 112 having or configured to have a spin Hall effect, a local magnetic field generation layer 118, and a magnetic tunnel junction (MTJ) layer 114. The local magnetic field generation layer 118 may be provided on a first surface S1 of the first SOT layer 112. The MTJ layer 114 may be provided on the second surface S2 of the first SOT layer 112. The first surface S1 and the second surface S2 may be spaced apart from each other, may be parallel to each other, and may face each other. In FIG. 1, the first surface 51 may be represented as a bottom surface of the first SOT layer 112, but depending on the viewpoint of the magnetic memory device 100, the first surface 51 may be a top surface, a side surface, or an inclined surface. In FIG. 1, the second surface S2 may be expressed as an upper surface of the first SOT layer 112, but depending on the viewpoint of the magnetic memory device 100, the second surface S2 may be referred to as a bottom surface, a side surface, or an inclined surface. The local magnetic field generation layer 118 and the MTJ layer 114 may be provided to face each other with the first SOT layer 112 therebetween. The local magnetic field generation layer 118 may be provided to generate a magnetic field capable of affecting the operation of the MTJ layer 114. For example, the local magnetic field generation layer 118 is or includes a layer that can generate a magnetic field capable of affecting a writing operation on the MTJ layer 114, for example, a switching of the magnetization direction of a free layer of the MTJ layer 114, and/or may include a layer structure including such a layer. When a current (e.g., spin current) is applied to the local magnetic field generation layer 118, a magnetic moment parallel or substantially parallel to the MTJ layer 114 is formed in the local magnetic field generation layer 118, and the magnetic field is generated by the magnetic moment. The MTJ layer 114 may include first to third layers 14F, 14B, and 14P sequentially stacked on the second surface S2 of the first SOT layer 112, but example embodiments are not limited thereto. The first layer 14F may be or include a magnetic layer. The first layer 14F may have or be configured to have a magnetic moment, and an alignment direction of the magnetic moment of the first layer 14F may be switched by a magnetic field applied from outside the first layer 14F. For example, a magnetization direction of the first layer 14F may be switched by a magnetic field applied from outside the first layer 14F. Accordingly, the first layer 14F may be expressed as a free layer. In some example embodiments, the first layer 14F may be a ferromagnetic layer or include a ferromagnetic layer. The second layer 14B formed on the first layer 14F is a non-magnetic layer and may be a tunnel barrier layer. In some example embodiments, the second layer 14B may be or include an oxide layer. For example, the second layer 14B may include an MgO layer and/or an aluminum oxide layer, but is not limited thereto. In some example embodiments, the second layer 14B may include a boron nitride (BN) layer. The third layer 14P formed on the second layer 14B may be or include a magnetic layer. The third layer 14P may have a magnetic moment that may be considered fixed or substantially fixed. Therefore, unlike the magnetic moment of the first layer 14F, it is more difficult or much more difficult to change an alignment direction of the magnetic moment of the third layer 14P. For example, even in a magnetic field having an intensity capable of switching the magnetization direction of the first layer 14F, the magnetization direction of the third layer 14P may not be switched. In this respect, the third layer 14P may be expressed as a pinned layer. Because the magnetization direction of the third layer 14P is substantially fixed in this way, the MTJ layer 114 may exhibit a TMR effect according to the magnetization direction of the first layer 14F. For example, when the magnetization direction of the first layer 14F is the same as that of the third layer 14P, the magnetoresistance of the MTJ layer 114 is relatively low, and when the magnetization directions of the first and third layers 14F and 14P are opposite to each other or antiparallel with each other, the magnetic resistance of the MTJ layer 114 is relatively high. When the magnetoresistance of the MTJ layer 114 is low, it may be considered that bit data such as "0" is written, and when the magnetoresistance of the MTJ layer 114 is high, it may be considered that bit data such as "1" is written, however, the opposite situation is also possible. In some example embodiments, the third layer 14P may be a ferromagnetic layer or include a ferromagnetic layer. An upper electrode layer 116 is provided on the MTJ layer 114, that is, on the third layer 14P. The upper electrode layer 116 may be provided to cross the first SOT layer 112. For example, the upper electrode layer 116 may be an electrode wiring layer and may be disposed to vertically cross or substantially vertically cross the first SOT layer 112. In some example embodiments, the upper electrode layer 116 may include a conductive layer and may directly contact or indirectly contact the third layer 14P. For example, another conductive layer directly contacting both sides may further be provided between the third layer 14P and the upper electrode layer 116.

In some example embodiments, the first SOT layer 112 may be a line-shaped wiring layer aligned in parallel to a first direction (e.g., the X-axis direction). A first electrode layer E1 and a second electrode layer E2 respectively may be provided at both ends of the second surface S2 of the first SOT layer 112. The first and second electrode layers E1 and E2 may be expressed as first and second terminals. On the second surface S2, the MTJ layer 114 is present between the first electrode layer E1 and the second electrode layer E2. In the case of a SOT-MRAM including a plurality of magnetic memory devices 100, a plurality of MTJ layers may be formed between the first electrode layer E1 and the second electrode layer E2. In this way, when a plurality of MTJ layers are provided, a plurality of local magnetic field generation layers are provided on the first surface S1 of the first SOT layer 112 as the same number as the plurality of MTJ layers, and the plurality of MTJ layers and the plurality of local magnetic field generation layers may correspond one to one with the first SOT layer 112 therebetween. An operating current (e.g., a write current) may be applied to the first SOT layer 112 through the first and second electrode layers E1 and E2. The first SOT layer 112 may be or may include a metal layer exhibiting a spin Hall effect. In some example embodiments, the first SOT layer 112 may be or include a heavy metal-based material layer, but is not limited thereto. For example, the first SOT layer 112 may include at least one of W, Pt, Ta, and Hf, but is not limited thereto.

The local magnetic field generation layer 118 may be parallel or substantially parallel to the upper electrode layer 116, and alignment directions may be the same or substantially the same. The local magnetic field generation layer 118 may be aligned to cross the first SOT layer 112. For example, the local magnetic field generation layer 118 may perpendicularly cross or substantially perpendicularly cross the first SOT layer 112. In some example embodiments, a first width W1 of the local magnetic field generation layer 118 and a second width W2 of the MTJ layer 114 in the first direction may be the same as or different from each other. For example, the first width W1 may be greater than, equal to, or less than the second width W2.

In some example embodiments, the local magnetic field generation layer 118 may be a single layer. In this case, the local magnetic field generation layer 118 may be a magnetic SOT layer having a spin Hall effect or a synthetic antiferromagnet (SAF) layer or may include the magnetic SOT layer or the SAF layer. In some example embodiments, the magnetic SOT layer may be or include a ferromagnetic layer exhibiting a spin Hall effect. For example, the magnetic SOT layer may be or include an iridium manganese (IrMn) layer. In some example embodiments, the SAF layer may have a layer structure exhibiting a spin Hall effect. For example, the SAF layer may be formed by sequentially stacking a first ferromagnetic layer, a first metal layer, and a second ferromagnetic layer. In some example embodiments, the first ferromagnetic layer may be or include one or more of a CoFeB layer or a CoPt layer, but is not limited thereto. In some example embodiments, the first metal layer may be a heavy metal layer, for example, an Ir layer or a Ru layer, or may include such a layer, but is not limited thereto. In some example embodiments, the second ferromagnetic layer may be or include a CoFeB layer or a CoPt layer, but is not limited thereto.

Figure 2:
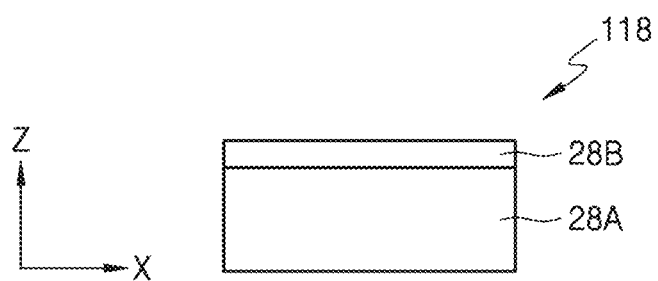
FIGS. 2 and 3 are cross-sectional views illustrating various embodiments of a layer structure of a local magnetic field generation layer of the SOT magnetic memory device of FIG. 1.

In some example embodiments, the local magnetic field generation layer 118 may be a multi-layer. For example, as shown in FIG. 2, the local magnetic field generation layer 118 may include a first layer 28A and a second layer 28B sequentially stacked. The second layer 28B may directly contact the first surface S1 of the first SOT layer 112. The first layer 28A is spaced apart from the first SOT layer 112. In some example embodiments, the first layer 28A may be or include any one of a non-magnetic SOT layer, a magnetic SOT layer, and a SAF layer, but is not limited thereto. In some example embodiments, the second layer 28B may be or include any one of an insulating layer, a magnetic layer, and a SAF layer, but is not limited thereto. In this way, because various materials may be used for the first and second layers 28A and 28B, the layer structure of the local magnetic field generation layer 118 may have various combinations.

For example, the local magnetic field generation layer 118 may include a first layer structure in which the first layer 28A is a non-magnetic SOT layer and the second layer 28B is a magnetic layer. In the first layer structure, the non-magnetic SOT layer may be referred to as a second SOT layer. In some example embodiments, the second SOT layer may include the same material as or a different material from the first SOT layer 112. For example, the second SOT layer may be a heavy metal-based material layer or include such a material layer. In some example embodiments, the magnetic layer may be a ferromagnetic layer or include a ferromagnetic layer. In some example embodiments, the magnetic layer may include one or more of CoFeB, CoPt, CoPt multilayer, CoTbB, and $Co_2MnSi$, but is not limited thereto.

In some example embodiments, the local magnetic field generation layer 118 may include a second layer structure in which the first layer 28A is a magnetic SOT layer and the second layer 28B is an insulating layer. In some example embodiments, the magnetic SOT layer may be a ferromagnetic SOT layer or include a ferromagnetic SOT layer. In some example embodiments, the magnetic SOT layer may include an IrMn layer. In some example embodiments, the insulating layer may be an oxide layer or include an oxide layer. In some example embodiments, the oxide may include a magnesium oxide (e.g., MgO) layer and/or a nickel oxide (e.g., NiO) layer, but is not limited thereto.

In some example embodiments, the local magnetic field generation layer 118 may include a third layer structure in which the first layer 28A is an SAF layer and the second layer is an insulating layer. In this case, the SAF layer may have the layer structure described with reference to FIG. 1.

In some example embodiments, the local magnetic field generation layer 118 may include a fourth layer structure in which the first layer 28A is a non-magnetic SOT layer and the second layer 28B is an SAF layer.

In some example embodiments, the local magnetic field generation layer 118 may include a fifth layer structure in which the first layer 28A is a magnetic SOT layer and the second layer 28B is an SAF layer.

Figure 3:
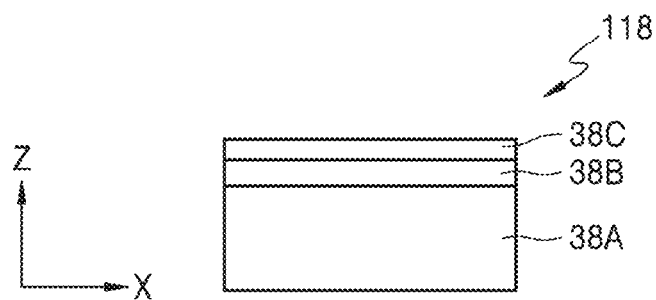

In some example embodiments, as shown in FIG. 3, the local magnetic field generation layer 118 may include a multilayer structure in which first to third layers 38A, 38B, and 38C are sequentially stacked.

The third layer 38C may directly contact the first surface S1 of the first SOT layer 112. The first and second layers 38A and 38B are spaced apart from the first SOT layer 112. In some example embodiments, the first layer 38A may be or include the second SOT layer. In some example embodiments, the second layer 38B may be or include a magnetic layer. For example, the second layer 38B may be a ferromagnetic layer or include a ferromagnetic layer. In some example embodiments, the third layer 38C may be or include the insulating layer described in the second layer structure with reference to FIG. 2.

Figure 4:
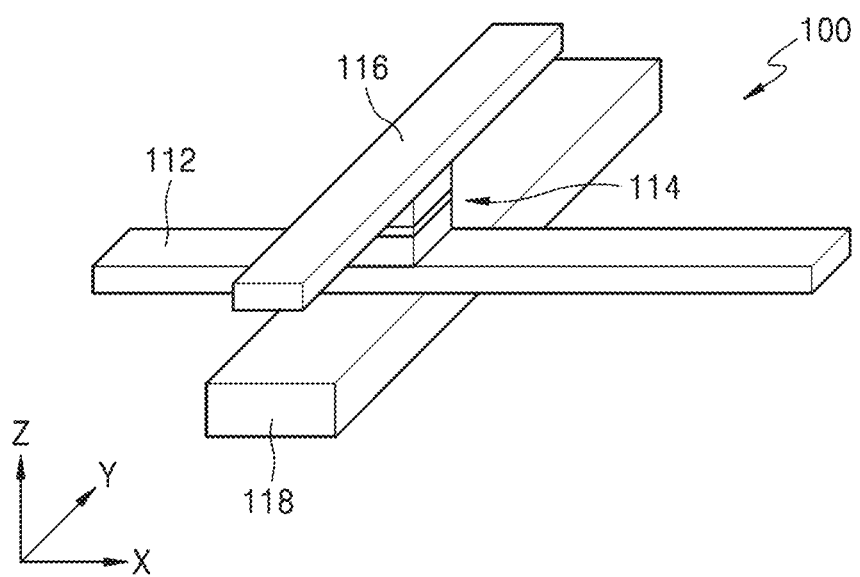
FIG. 4 is a three-dimensional view illustrating the SOT magnetic memory device of FIG. 1 when the local magnetic field generation layer has a single layer structure.

FIG. 4 is a perspective view of the SOT magnetic memory device 100 when the local magnetic field generation layer 118 is a single layer structure.

Referring to FIG. 4, the first SOT layer 112 is disposed to vertically cross the upper electrode layer 116 and the local magnetic field generation layer 118. The upper electrode layer 116 and the local magnetic field generation layer 118 are disposed parallel to each other in a second direction (e.g., a Y-axis direction) and vertically disposed in a third direction (e.g., a Z-axis direction). The MTJ layer 114 is provided between the first SOT layer 112 and the upper electrode layer 116 at an intersection or intersection region of the first SOT layer 112 and the upper electrode layer 116.

Figure 5:
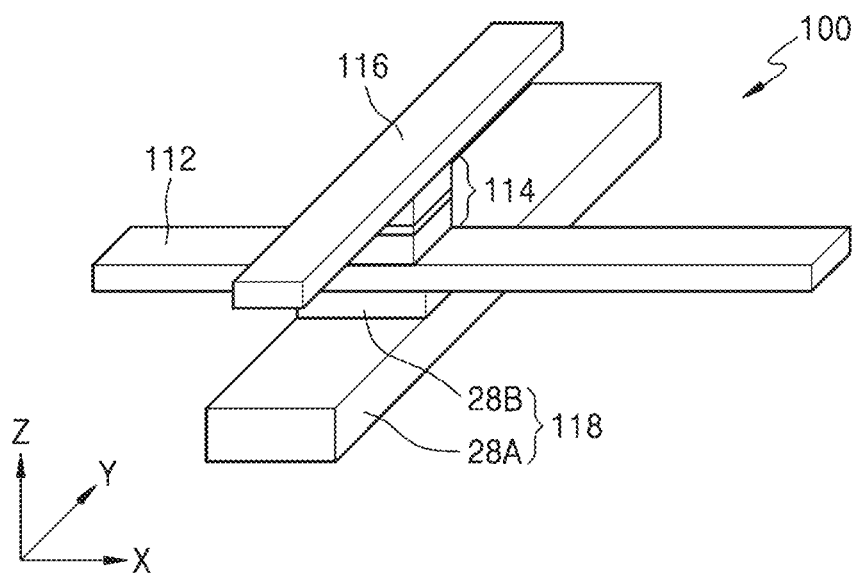
FIGS. 5 and 6 are three-dimensional views illustrating the SOT magnetic memory device of FIG. 1 when the local magnetic field generation layer has a multi-layer structure.

FIG. 5 is a perspective view of the SOT magnetic memory device 100 when the local magnetic field generation layer 118 has a multilayer structure including the first and second layers 28A and 28B as illustrated in FIG. 2.

Referring to FIG. 5, the first SOT layer 112 is disposed to vertically cross the upper electrode layer 116 and the first layer 28A. The upper electrode layer 116 and the first layer 28A are disposed parallel to each other in the second direction (e.g., the Y-axis direction) and are vertically disposed in the third direction (e.g., the Z-axis direction). The second layer 28B of the local magnetic field generation layer 118 is formed on a partial region of, e.g. only in a partial region of, the first layer 28A, and is located at an intersection or intersection region between the first layer 28A and the first SOT layer 112. The second layer 28B is disposed to face the MTJ layer 114 with the first SOT layer 112 therebetween. In some example embodiments, a length of the second layer 28B in the second direction may be greater than a length of the MTJ layer 114. For example, the length of the second layer 28B in the second direction may be greater than a width of the first SOT layer 112. A disposition relationship of the MTJ layer 114, the first SOT layer 112, and the upper electrode layer 116 may be the same as that of FIG. 4.

Figure 6:
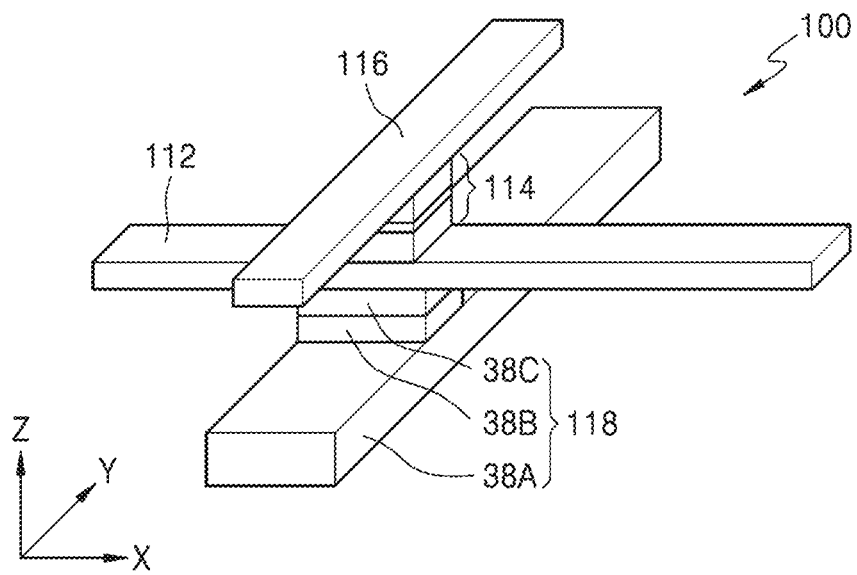

FIG. 6 shows a three dimensional view of the SOT magnetic memory device 100 when the local magnetic field generation layer 118 has a multilayer structure including the first to third layers 38A to 38C as illustrated in FIG. 3.

Referring to FIG. 6, the first SOT layer 112 is disposed to vertically cross the upper electrode layer 116 and the first layer 38A. The upper electrode layer 116 and the first layer 38A are disposed parallel to each other in the second direction (e.g., the Y-axis direction) and are vertically disposed in the third direction (e.g., the Z-axis direction). The second layer 38B of the local magnetic field generation layer 118 is formed on a region of the first layer 38A, and the third layer 38C is provided on the second layer 38B. The second and third layers 38B and 38C are provided at an intersection or intersection region between the first layer 38A and the first SOT layer 112.

Accordingly, the second and third layers 38B and 38C may face the MTJ layer 114 with the first SOT layer 112 therebetween. In some example embodiments, a length of the second layer 38B in the second direction may be greater than a length of the MTJ layer 114. For example, the length of the second layer 38B in the second direction may be greater than a width of the first SOT layer 112. The length of the third layer 38C and the length of the second layer 38B in the second direction may be the same or different from each other. For example, the length of the third layer 38C in the second direction may be less than or equal to the length of the second layer 38B. A disposition relationship of the MTJ layer 114, the first SOT layer 112, and the upper electrode layer 116 may be the same as that of FIG. 4.

Figure 7:
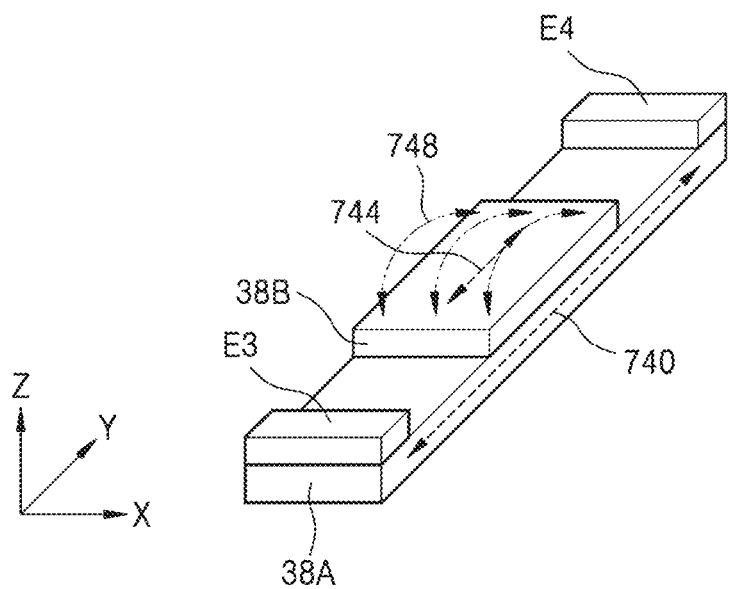
FIG. 7 is a three-dimensional view illustrating a case in which a local magnetic field is generated in a local magnetic field generation layer of an SOT magnetic memory device according to various example embodiments.

FIG. 7 shows a magnetic field generated in the local magnetic field generation layer 118 of the SOT magnetic memory device 100. FIG. 7 shows a magnetic field generated in the local magnetic field generation layer 118 when the local magnetic field generation layer 118 has the layer structure illustrated in FIG. 3. For convenience, the third layer 38C, which is an insulating layer, is not shown in FIG. 7.

Referring to FIG. 7, reference number E3 denotes a third electrode layer formed on one end of the first layer 38A, and E4 denotes a fourth electrode layer formed on the other end of the first layer 38A. The third and fourth electrode layers E3 and E4 may be expressed as one or more of electrode pads, electrode pad layers, terminal layers, and/or the like. The second layer 38B is positioned between the third and fourth electrode layers E3 and E4 and spaced apart from the third and fourth electrode layers E3 and E4. The second layer 38B and the third and fourth electrode layers E3 and E4 are all formed on the same surface of the first layer 38A.

When a voltage is applied to the first layer 38A through the third and fourth electrode layers E3 and E4, a current 740 flows through the first layer 38A. The current 740 may flow in the second direction (e.g., the positive (+) direction of the Y-axis) or the opposite direction (e.g., the negative (−) direction of the Y-axis) according to a voltage application condition. In some example embodiments, the current 740 may be or include a spin current. As the current 740 passes under the second layer 38B, which is a magnetic layer, a spin current flows to the second layer 38B due to the SOT effect, and thus, a magnetic moment 744 of the second layer 38B may be aligned to be parallel to the second direction. The direction of the magnetic moment 744 of the second layer 38B may be parallel or opposite/antiparallel to the second direction according to the spin direction of the spin current flowing in the second layer 38B. In either direction, the direction of the magnetic moment 744 is perpendicular or substantially perpendicular to the first direction (X-axis direction).

As the magnetic moments 744 of the first SOT layer 112 and the second layer 38B are aligned in this way, a magnetic field 748 is generated on a surface of the second layer 38B due to the aligned magnetic moments 744. The direction of the magnetic field 748 may be determined according to the alignment direction of the magnetic moment 744. Because the magnetic field 748 is generated by the magnetic moment 744 of the second layer 38B, a region where the magnetic field 748 exists may be limited to the second layer 38B. In this sense, the magnetic field 748 may be referred to as a local magnetic field.

Because the MTJ layer 114 is provided above, e.g. directly above the second layer 38B, the first layer 14F of the MTJ layer 114 may be exposed to the magnetic field 748. For example, first layer 14F of MTJ layer 114 may be in the magnetic field 748. In the SOT magnetic memory device 100, the first layer 14F of the MTJ layer 114 is formed on the first SOT layer 112. Therefore, when a current flows under the MTJ layer 114 through the first SOT layer 112, the spin current flows from the first SOT layer 112 to the first layer 14F due to an SOT effect, and the alignment of the magnetic moment of the first layer 14F is affected according to a spin state (spin up or spin down) of the spin current. As a result, in an operation (e.g., write operation) of the SOT magnetic memory device 100, the first layer 14F of the MTJ layer 114 is affected by both the spin current transmitted through the first SOT layer 112 and the magnetic field 748 generated from the local magnetic field generation layer 118. Therefore, the alignment direction or magnetization direction of the magnetic moment of the first layer 14F may be determined by a current applied to the first SOT layer 112 and a current applied to the local magnetic field generation layer 118. Because the magnetoresistance of the MTJ layer 114 varies according to the magnetization direction of the first layer 14F of the MTJ layer 114, which is a free layer, it may be said that the magnetoresistance of the MTJ layer 114 is determined by a current applied to the first SOT layer 112 and a current applied to the local magnetic field generation layer 118. For example, because a magnetoresistance state of the MTJ layer 114 represents logical data such as bit data 0 or 1, bit data 0 or 1 may be written in the SOT magnetic memory device 100 according to conditions of the current applied to the first SOT layer 112 and the current applied to the local magnetic field generation layer 118.

Next, a method of operating the SOT magnetic memory device 100 according to various example embodiments will be described.

Figure 8:
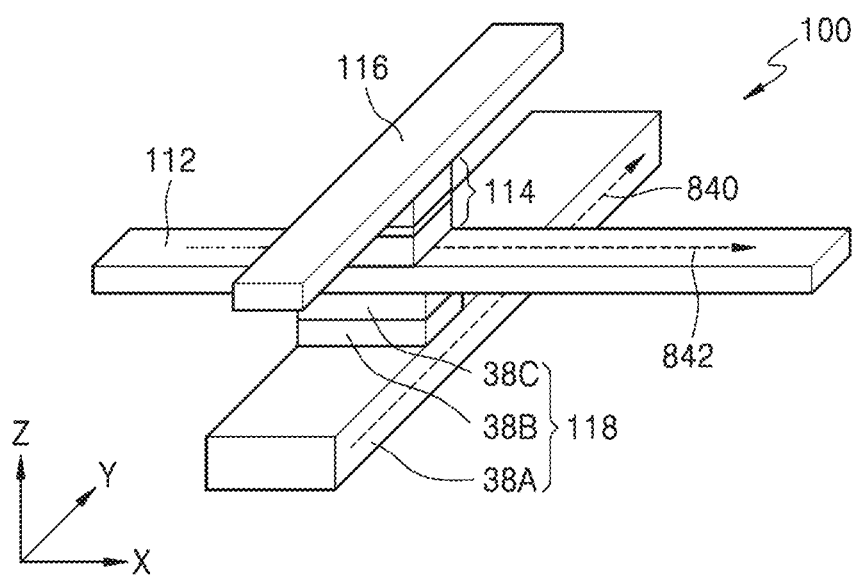
FIG. 8 is a three-dimensional view illustrating a first operating method of the SOT magnetic memory device shown in FIG. 6.

FIG. 8 shows a first operating method for the SOT magnetic memory device 100 shown in FIG. 6. The first operating method illustrated in FIG. 8 may be equally applied to the SOT magnetic memory device 100 illustrated in FIGS. 4 and 5.

The first operating method may be a write operation. The write operation is or corresponds to or includes an operation of writing bit data into the SOT magnetic memory device 100. Accordingly, the write operation may be expressed as a data writing operation or a data storing operation.

Referring to FIG. 8, in a write operation, a first current 840 is applied to the first layer 38A of the local magnetic field generation layer 118. The first current 840 may be the same type as the current 740 described in FIG. 7. Although, for convenience, the direction in which the first current 840 flows is set to be the second direction (+ direction of the Y-axis), the direction in which the first current 840 flows may be an opposite direction to the second direction (− direction of the Y-axis). A magnetic moment is aligned in the second layer 38B by the first current 840, and a local magnetic field affecting the first layer 14F of the MTJ layer 114 is generated from the second layer 38B. Afterwards, the application of the first current 840 is stopped or reduced. In some example embodiments, the second layer 38B may be or may include a ferromagnetic layer. Accordingly, a magnetic field generated in the second layer 38B by the first current 840 may be maintained. Due to the magnetic field generated in the second layer 38B, the magnetic moment of the first layer 14F of the MTJ layer 114 may remain a rotated state by a given angle in a given rotation direction. However, the magnetic moment of the first layer 14F of the MTJ layer 114 is not completely switched in the opposite direction only by the magnetic field generated in the second layer 38B.

Next, a second current 842 is applied to the first SOT layer 112. The second current 842 is set to flow in the first direction (+ direction of the X axis), but the second current 842 may be applied to flow in an opposite direction (− direction of the X axis). A spin current flows from the first SOT layer 112 to the first layer 14F by an SOT effect, and the magnetic moment of the first layer 14F rotated by a given angle may be completely switched in an opposite direction by the spin current.

As a result, when the direction of the magnetic moment of the first layer 14F, e.g., the magnetization direction of the first layer 14F, is the same as the magnetization direction of the third layer 14P, logical data such as data 0 may be regarded as recorded, and when the magnetization direction of the third layer 14P is opposite, logical data such as data 1 may be regarded as recorded. Because data is written by the first and second currents 840 and 842, one of the first current 840 and the second current 842 may be referred to as a first write current and the other as a second write current. Also, one of the first current 840 and the second current 842 may be expressed as a main write current and the other as an auxiliary write current.

Figure 9:
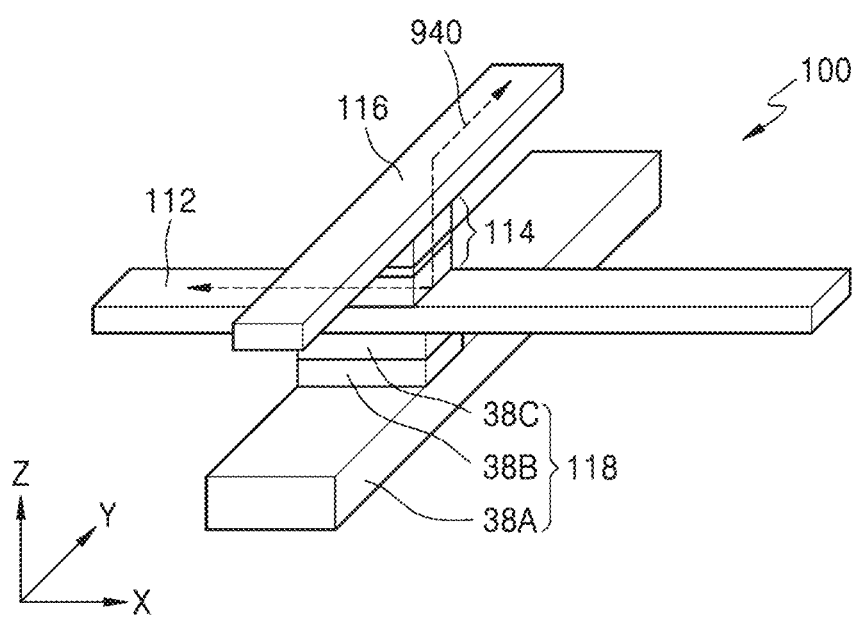
FIG. 9 is a three-dimensional view illustrating a second operating method of the SOT magnetic memory device shown in FIG. 6.

FIG. 9 shows a second operating method for the SOT magnetic memory device 100 shown in FIG. 6. The second operating method illustrated in FIG. 9 may be equally applied to the SOT magnetic memory device 100 illustrated in FIGS. 4 and 5.

The second operating method may be or may include an operation of reading data recorded in the SOT magnetic memory device 100.

Referring to FIG. 9, in the read operation, a voltage is applied to one end of the first SOT layer 112 and one end of the upper electrode layer 116 so that a potential difference is formed between the two ends. Accordingly, a third current 940 passing through the MTJ layer 114 flows between one end of the first SOT layer 112 and one end of the upper electrode layer 116. The third current 940 may be a read current. A resistance of the MTJ layer 114 is read by measuring the third current 940. If the resistance of the MTJ layer 114 is lower than a reference resistance, it may be determined that logical data such as data 0 is read, and if the resistance is higher than the reference resistance, it may be determined that logical data such as data 1 is read, but it may be determined conversely.

Considering the operating method with reference to FIGS. 8 and 9, in the SOT magnetic memory device 100 according to various example embodiments, the total number of terminals involved in the operation may be five, e.g. may be exactly five, including both ends of the first SOT layer 112, both ends of the local magnetic field generation layer 118, and the upper electrode layer. That is, the SOT magnetic memory device 100 may have five terminals, e.g. no more than five terminals or no less than five terminals, in total.

The method of operating the SOT magnetic memory device 100 described with reference to FIGS. 8 and 9 may be applied to a multi-bit SOT magnetic memory device including a plurality of the SOT magnetic memory cells described above.

Figure 10:
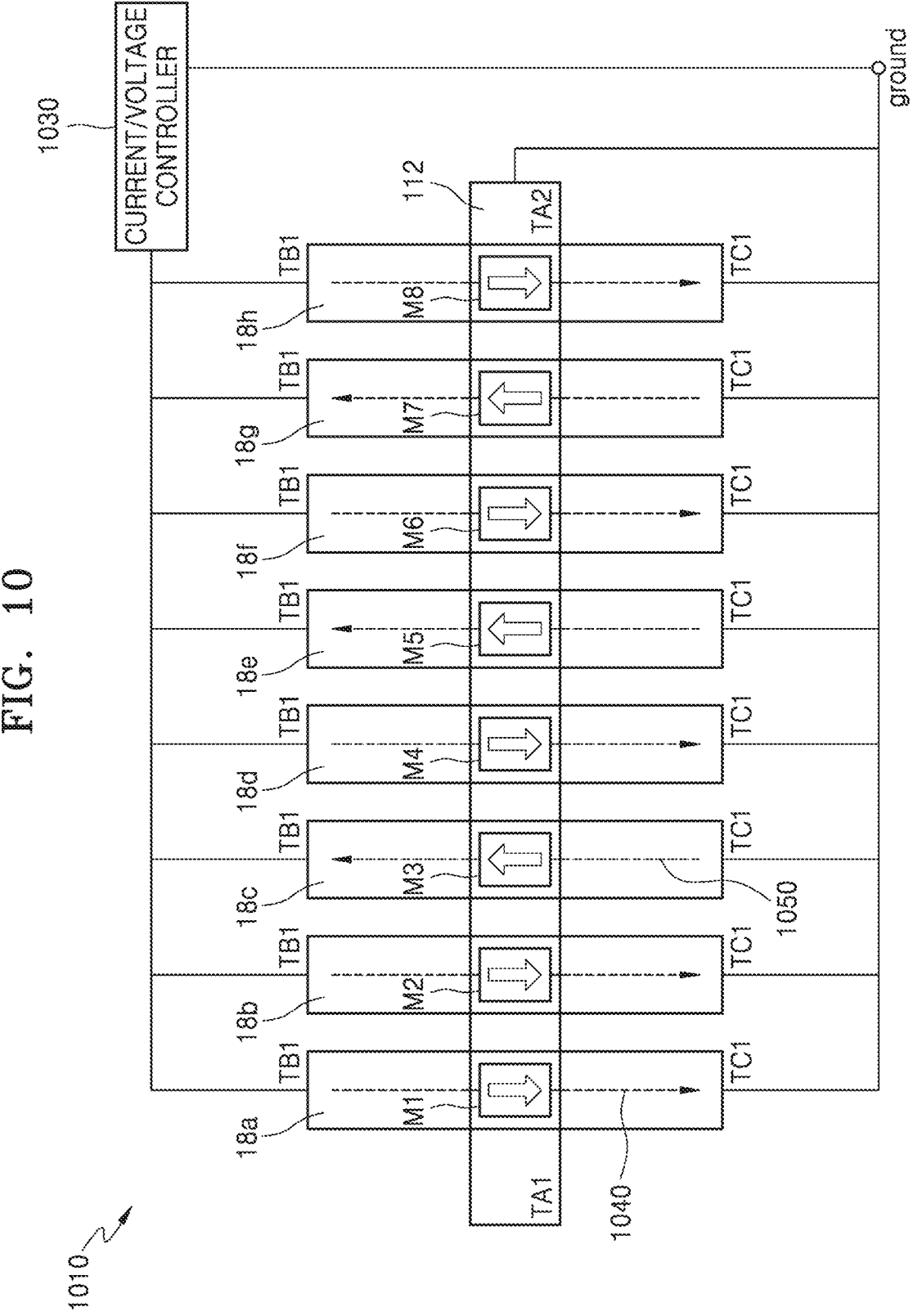
FIGS. 10 and 11 are plan views illustrating a write operation of an 8-bit SOT magnetic memory device (SOT-MRAM) including 8 SOT magnetic memory cells.
Figure 11:
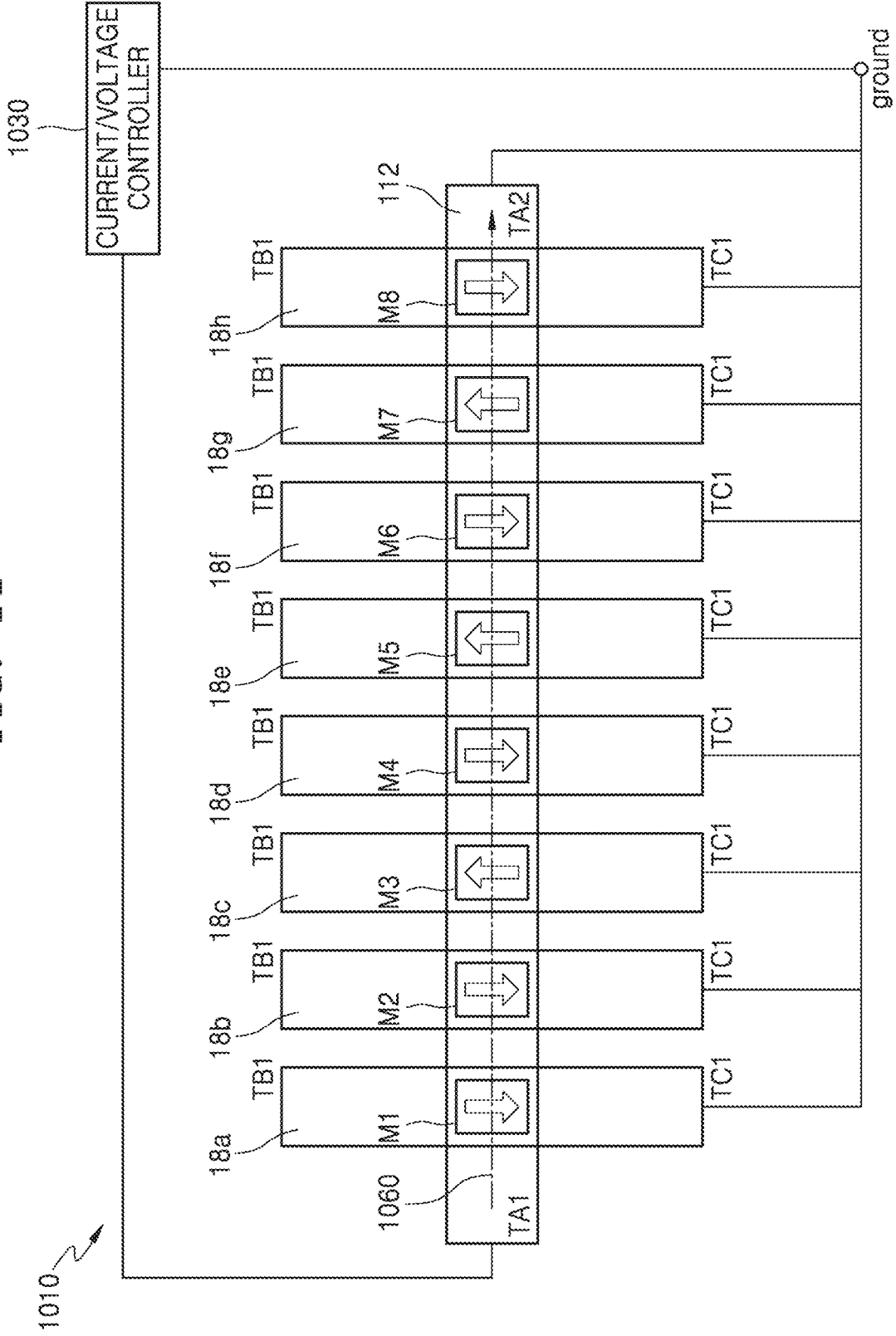

As an example, FIGS. 10 and 11 are plan views illustrating a write operation for an 8-bit SOT MRAM 1010 including 8 SOT magnetic memory cells.

Referring to FIGS. 10 and 11, the 8-bit SOT MRAM 1010 includes first to eighth local magnetic field generation layers 18*a* to 18*h* arranged in parallel and parallel to each other, and a first SOT layer 112 perpendicularly crossing the first to eighth local magnetic field generation layers 18*a* to 18*h*. The first SOT layer 112 may be a common SOT layer shared by the first to eighth local magnetic field generation layers 18*a* to 18*h*. In some example embodiments, materials of the first to eighth local magnetic field generation layers 18*a* to 18*h* may be the same as each other, and/or a layer structures and/or layer configurations thereof may be the same as each other; however, example embodiments are not limited thereto. For example, the first to eighth local magnetic field generation layers 18*a* to 18*h* may correspond to the local magnetic field generation layer 118 of the SOT magnetic memory device 100 illustrated in FIG. 6. Reference numerals M1-M8 denote magnetic layers included in the respective local magnetic field generation layers 18*a* to 18*h*. The magnetic layers M1 to M8 may be identical to each other in terms of material and may be identical or substantially identical to each other in terms of specifications. In some example embodiments, each of the magnetic layers M1 to M8 may correspond to the second layer 38B of the local magnetic field generation layer 118 of the SOT magnetic memory device 100 shown in FIG. 6. In some example embodiments, the magnetic layers M1 to M8 may be ferromagnetic layers. Members corresponding to the third layer 38C of the local magnetic field generation layer 118 of the SOT magnetic memory device 100 of FIG. 6 are not shown in FIGS. 10 and 11 for convenience of illustration. Also, the MTJ layer 114 provided on the first SOT layer 112 is not shown in FIGS. 10 and 11.

In FIGS. 10 and 11, reference numeral TB1 denotes one end or a terminal layer formed on one end of each of the local magnetic field generation layers 18*a* to 18*h*, and TC1 denotes the other end or a terminal layer formed on the other end of each of the local magnetic field generation layers 18*a* to 18*h*. Also, reference number TA1 denotes one end of the first SOT layer 112 or a terminal layer provided at one end, and TA2 denotes the other end or a terminal layer provided at the other end.

Reviewing at the write operation for the 8-bit SOT-MRAM 1010, as a first step, as shown in FIG. 10, a first current 1040 or a second current 1050 respectively may be applied to the first to eighth local magnetic field generation layers 18*a* to 18*h* from a current/voltage controller 1030. The first current 1040 and the second current 1050 may have the same magnitude but different directions. The first current 1040 may be a current applied to flow from one end TB1 to the other end TC1 of each of the local magnetic field generation layers 18*a* to 18*h*, and the second current 1050 may be a current applied to flow from the other end TC1 to one end TB1 of each of the local magnetic field generation layers 18*a* to 18*h*. As the first current 1040 or the second current 1050 is applied to each of the local magnetic field generation layers 18*a* to 18*h*, a magnetic moment aligned in the same direction as the flow direction of the applied current is formed in the magnetic layers M1 to M8 provided at intersections of the local magnetic field generation layers 18*a* to 18*h* and the first SOT layer 112. A local magnetic field is generated at the intersection of each of the local magnetic field generation layers 18*a* to 18*h* and the first SOT layer 112 by the magnetic moment. An arrow in each magnetic layer M1 to M8 indicates a magnetic moment of each of the magnetic layers M1 to M8 aligned by the first current 1040 or the second current 1050.

The alignment direction of the magnetic moment in each of the magnetic layers M1 to M8 may be determined in consideration of bit data to be written in each memory cell. As such, the magnetic moment of each of the magnetic layers M1 to M8 is aligned or pre-aligned in consideration of the bit data to be written, in a subsequent process, by applying a set current required to complete data writing to the first SOT layer 112, data may be simultaneously written to the eight SOT memory cells.

Next, after aligned magnetic moments are formed in each of the magnetic layers M1 to M8, the application of the first and second currents 1040 and 1050 to each of the local magnetic field generation layers 18*a* to 18*h* is stopped or reduced. Because each of the magnetic layers M1 to M8 includes a ferromagnetic layer, the aligned magnetic moment of each of the magnetic layers M1 to M8 may be maintained even if the application of the first and second currents 1040 and 1050 is stopped or reduced.

After stopping the application of the first and second currents 1040 and 1050, as shown in FIG. 11, an electrical connection between the current/voltage controller 1030 and the first to eighth local magnetic field generation layers 18*a* to 18*h* is turned off, the current/voltage controller 1030 and one end TA1 of the first SOT layer 112 are electrically connected (turned on), and then, a third current 1060 is applied to the first SOT layer 112. The third current 1060 may include a current corresponding to or greater than a threshold current required to switch a magnetization direction of the free layer of the MTJ layer corresponding to each of the magnetic layers M1 to M8 in consideration of the magnetic moment of each of the magnetic layers M1-M8.

As described above, while the third current 1060 is applied to the first SOT layer 112, data may be simultaneously or concurrently written to the eight memory cells sharing the first SOT layer 112, and because the third current 1060 is within an allowable instantaneous power usage range, the 8-bit SOT magnetic memory device may be synchronized with an external electronic apparatus.

The read operation may include an operation of measuring of a resistance of the MTJ layer by applying a read current between the one end TA1 of the first SOT layer 112 and the upper electrode layer on the MTJ layer corresponding to each of the magnetic layers M1 to M8, and an operation of comparing the measured resistance with a reference resistance.

Meanwhile, in an operation of applying the third current 1060 to the first SOT layer 112, as shown in FIG. 11, it is depicted that the connection between the current/voltage controller 1030 and the first to eighth local magnetic field generation layers 18a to 18h is disconnected, but the connection between the current/voltage controller 1030 and the first to eighth local magnetic field generation layers 18a to 18h may be maintained in a connected state, and the electrical connection between the current/voltage controller 1030 and the first to eighth local magnetic field generation layers 18a to 18h may be regulated by using a switching element (e.g., transistor) provided on a wire that connects the current/voltage control unit 1030 and the first to eighth local magnetic field generation layers 18a to 18h. FIGS. 10 and 11 illustrate a multi-bit data storage device as an example, and are not intended to limit the multi-bit data storage device thereto. Therefore, the operating method described with reference to FIGS. 10 and 11 may also be applied to an SOT MRAM including n SOT magnetic memory cells. For example, the operating method described with reference to FIGS. 10 and 11 may also be applied to an SOT MRAM including 8 or more, 16 or more, 32 or more, or 64 or more SOT magnetic memory cells; the number of SOT magnetic memory cells may be a power of two; however, example embodiments are not limited thereto.

Figure 12:
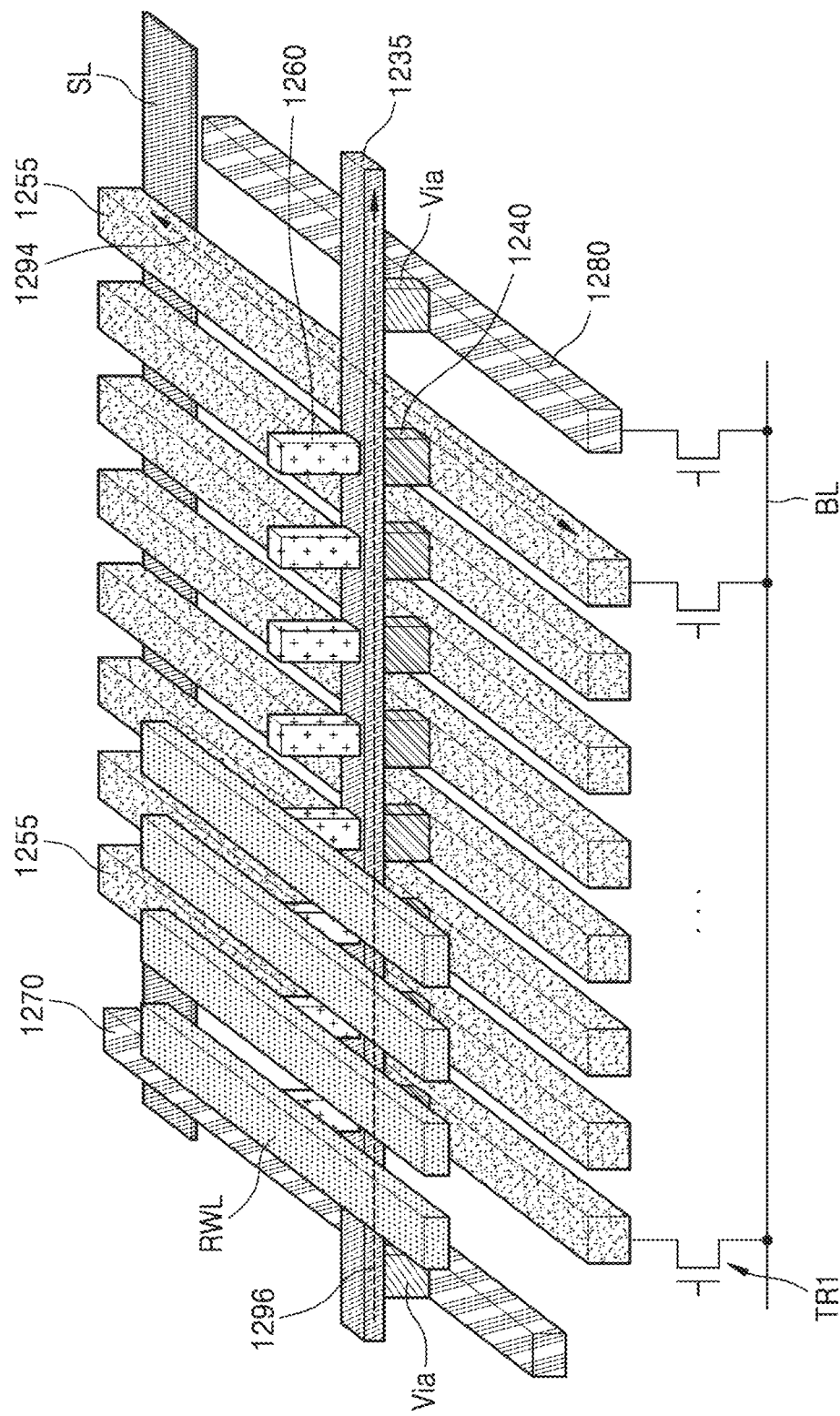
FIG. 12 is a three-dimensional view illustrating the 8-bit SOT memory device illustrated in FIGS. 10 and 11 in more detail.

FIG. 12 is a three-dimensional view more specifically showing the 8-bit SOT memory device schematically illustrated in FIGS. 10 and 11.

Reference number 1235 denotes a first SOT layer, and 1255 denotes a second SOT layer crossing the first SOT layer 1235. For example, the second SOT layer 1255 may correspond to the first layer 38A of the local magnetic field generation layer 118 of the SOT magnetic memory device 100 illustrated in FIG. 6. Reference number 1240 denotes a stack including a magnetic layer provided between the first SOT layer 1235 and the second SOT layer 1255. In some example embodiments, the stack 1240 may include a magnetic layer and an insulating layer sequentially stacked on a limited, or generating, region of the second SOT layer 1255. In some example embodiments, the stack 1240 may be a stack including sequentially stacked second and third layers 38B and 38C of the local magnetic field generation layer 118 of the SOT magnetic memory device 100 illustrated in FIG. 6. Reference numeral 1260 denotes an MTJ layer. Reference numerals 1270 and 1280 denote first and second conductive lines. The first and second conductive lines 1270 and 1280 may be connected to both ends of the first SOT layer 1235 through vias. The eight second SOT layers 1255 are aligned between the first conductive line 1270 and the second conductive line 1280.

Reference numeral SL denotes a source line connected to one end of the second SOT layer 1255. Reference numeral RWL denotes a read word line. The read word line RWL may correspond to the upper electrode layer 116 provided on the MTJ layer 114 of the SOT magnetic memory device 100 described above. FIG. 12 shows only four read word lines RWL for convenience. The read word lines RWL may perpendicularly cross the first SOT layer 1235 and may be disposed parallel to the second SOT layer 1255.

Reference number TR1 denotes a transistor connected to one end of the second SOT layer 1255. The transistor TR1 is provided between the second SOT layer 1255 and the bit line BL, and may be used to select the second SOT layer 1255 in a write operation. The transistor TR1 may be connected to a write word line (WWL).

Reference number 1294 may be a current applied to the second SOT layer 1255 in a write operation, and reference number 1296 indicates a current applied to the first SOT layer 1235 after the current 1294 applied to the second SOT layer 1255 is stopped in a write operation.

In a read operation, a read current may flow from the read word line RWL through the MTJ layer 1260 to one end of the first SOT layer 1235 (e.g., a side connected to the first conductive line 1270).

Next, an electronic apparatus(es) according to various example embodiments will be described. The electronic apparatus(es) according to various example embodiments may include the magnetic memory device (e.g., an SOT-MRAM) according to various example embodiments described above.

Figure 13:
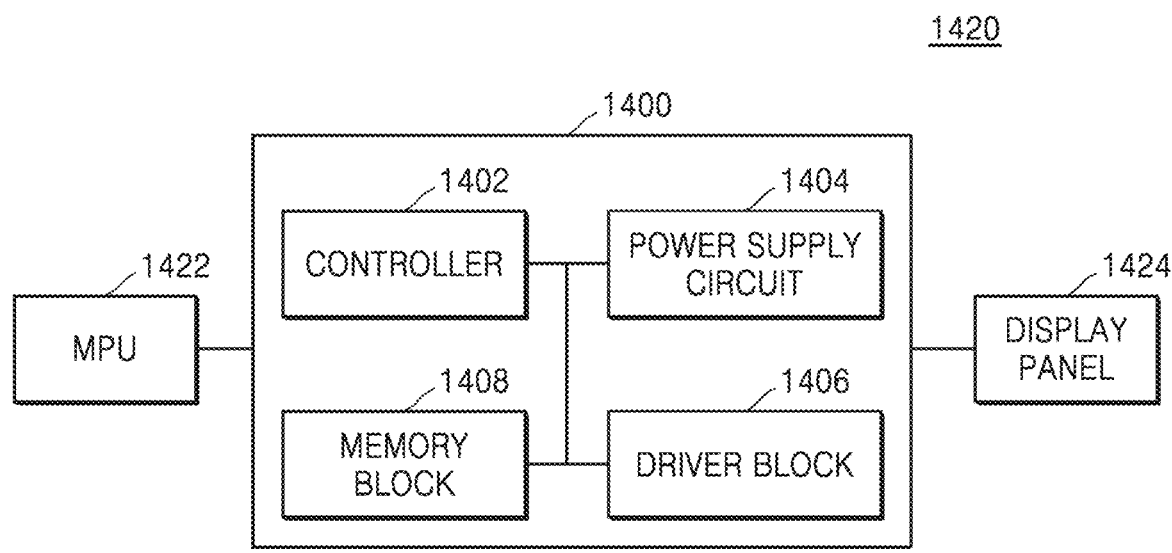
FIG. 13 is a block diagram illustrating a first electronic apparatus according to various example embodiments.

FIG. 13 is a schematic block diagram of a display driver IC (DDI) 1400 and a display device including the DDI 1400 as a first electronic apparatus according to various example embodiments.

Referring to FIG. 13, the DDI 1400 may include a controller 1402, a power supply circuit unit 1404, a driver block 1406, and a memory block 1408. The controller 1402 receives and decodes a command applied from a main processing unit (MPU) 1422 and controls each block of the DDI 1400 to implement an operation according to the command. The power supply circuit 1404 generates a driving voltage in response to the control of the controller 1402. The driver block 1406 drives a display panel 1424 using a driving voltage generated by the power supply circuit unit 1404 in response to the control of the controller 1402. The display panel 1424 may be or may include a liquid crystal display panel and/or a plasma display panel. The memory block 1408 is a block that temporarily stores a command input to the controller 1402 or control signals output from the controller 1402 or stores necessary data, and includes a volatile memory (e.g., RAM) and/or a non-volatile memory. In some example embodiments, the non-volatile memory may include a ROM and/or a SOT magnetic memory device according to various example embodiments described above.

Figure 14:
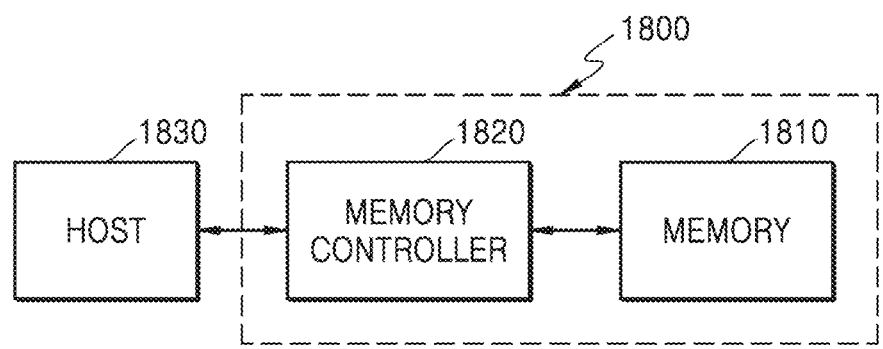
FIG. 14 is a block diagram illustrating a second electronic apparatus according to various example embodiments.

FIG. 14 is a block diagram illustrating an electronic system 1800 as a second electronic apparatus according to various example embodiments.

Referring to FIG. 14, the electronic system 1800 includes a memory 1810 and a memory controller 1820. The memory controller 1820 may control the memory 1810 to read data from and/or write data to the memory 1810 in response to a request from the host 1830. In some example embodiments, the memory 1810 may include the SOT magnetic memory device according to various example embodiments described above.

Figure 15:
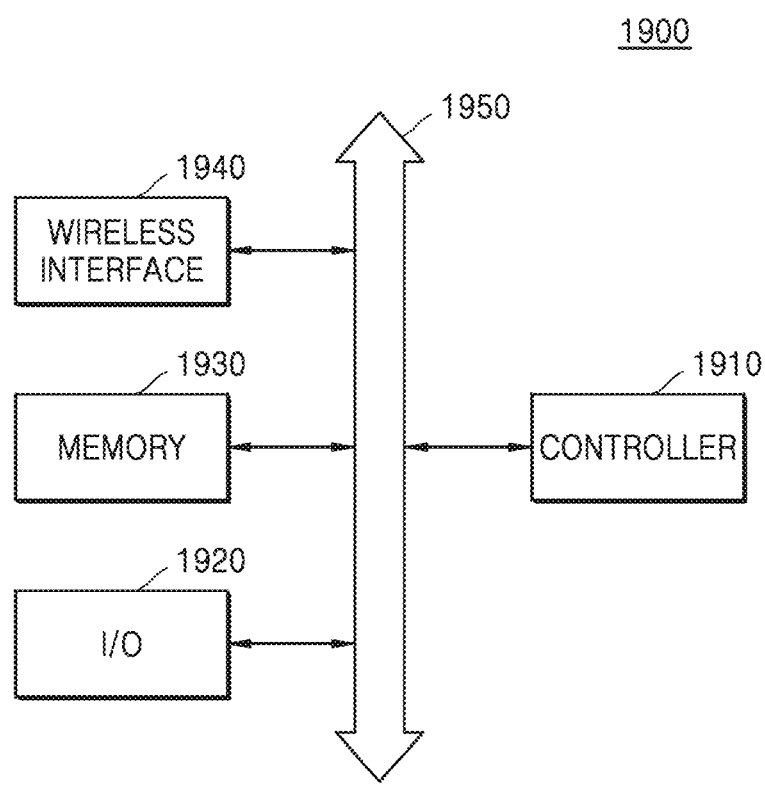
FIG. 15 is a block diagram illustrating a third electronic apparatus according to various example embodiments.

FIG. 15 is a block diagram of an electronic system 1900 as a third electronic apparatus according to various example embodiments.

Referring to FIG. 15, the electronic system 1900 may configure a wireless communication device or a device capable of transmitting and/or receiving information in a wireless environment. The electronic system 1900 includes a controller 1910, an input/output device 1920, a memory 1930, and a wireless interface 1940, and these components are interconnected to each other through a bus 1950.

The controller 1910 may include at least one of a microprocessor, a digital signal processor, and a processing device similar thereto. The input/output device 1920 may include at least one of a keypad, a keyboard, and a display.

The memory 1930 may be used to store instructions executed by the controller 1910. For example, the memory 1930 may be used to store user data. In some example embodiments, the memory 1930 may include the SOT magnetic memory device according to the embodiment described above.

The electronic system 1900 may use the wireless interface 1940 to transmit/receive data over a wireless communication network. The wireless interface 1940 may include an antenna and/or a wireless transceiver. In some example embodiments, the electronic system 1900 may be used in a communication interface protocol of a third-generation communication system, for example, one or more of code division multiple access (CDMA), global system for mobile communications (GSM), north American digital cellular (NADC), extended-time division multiple access (E-TDMA), and/or wide band code division multiple access (WCDMA).

Figure 16:
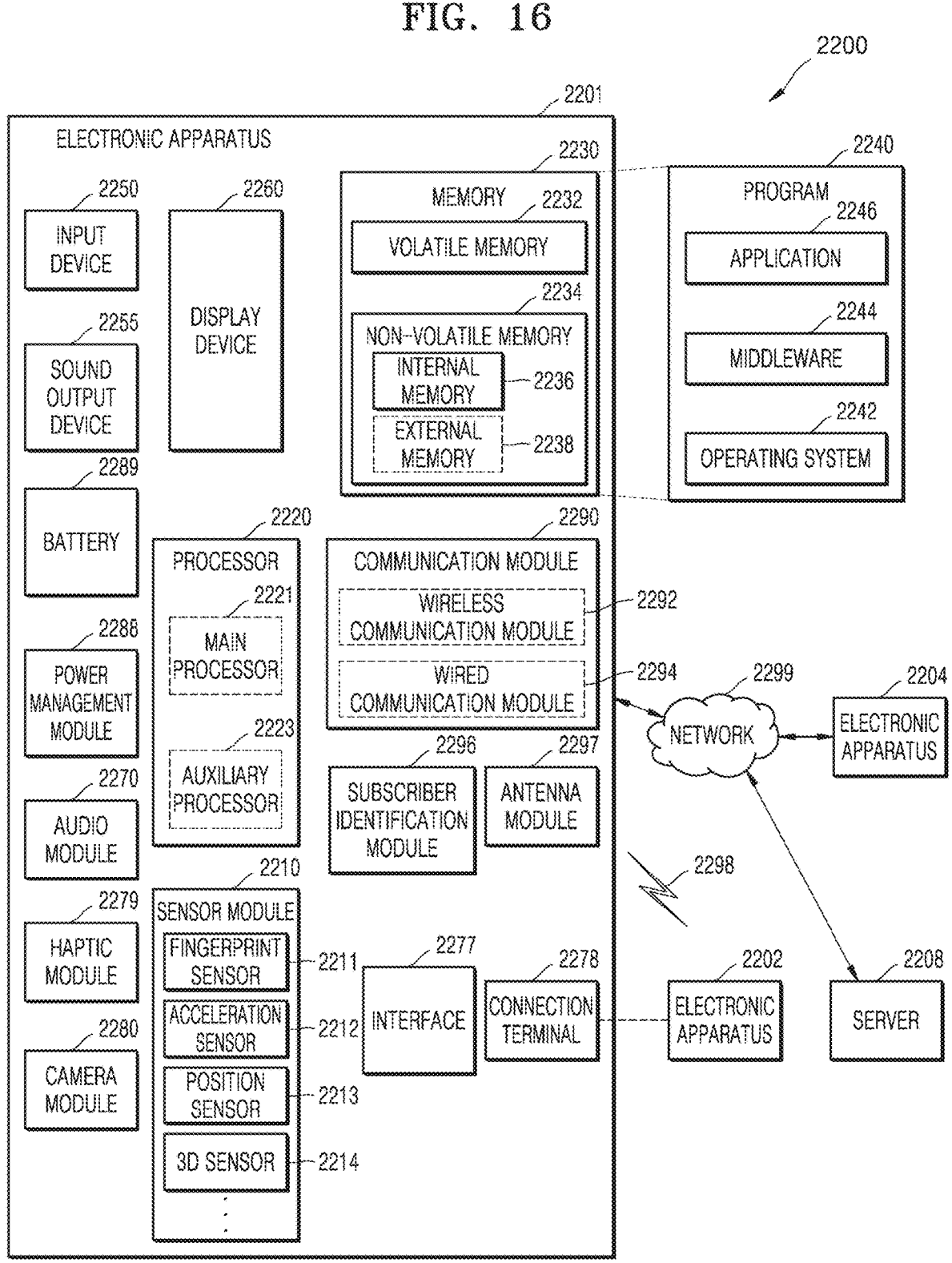
FIG. 16 is a block diagram illustrating a schematic configuration of a fourth electronic apparatus according to various example embodiments.

FIG. 16 is a block diagram showing a schematic configuration of a fourth electronic apparatus according to various example embodiments.

Referring to FIG. 16, in a network environment 2200, an electronic apparatus 2201 may communicate with another electronic apparatus 2202 through a first network 2298 (a short-range wireless communication network, etc.) and/or may communicate with another electronic apparatus 2204 and/or a server 2208 through a second network 2299 (a remote wireless communication network). The electronic apparatus 2201 may communicate with another electronic apparatus 2204 through the server 2208. The electronic apparatus 2201 may include a processor 2220, a memory 2230, an input device 2250, an audio output device 2255, a display device 2260, an audio module 2270, a sensor module 2210, an interface 2277, a haptic module 2279, a camera module 2280, a power management module 2288, a battery 2289, a communication module 2290, a subscriber identification module 2296, and/or an antenna module 2297. In the electronic apparatus 2201, some of these components (e.g., the display device 2260) may be omitted or other components may be added. Some of these components may be implemented as one integrated circuit. For example, a fingerprint sensor 2211 of the sensor module 2210, an iris sensor, an illuminance sensor, etc. may be implemented in a form embedded in the display device 2260 (a display, etc.).

The processor 2220 may execute software (such as a program 2240) to control one or a plurality of other components (hardware, software components, etc.) of the electronic apparatus 2201 connected to the processor 2220, and may perform various data processing or operations. As part of data processing or operations, the processor 2220 may load commands and/or data received from other components (the sensor module 2210, the communication module 2290, etc.) into a volatile memory 2232, and may process commands and/or data stored in the volatile memory 2232, and store resulting data in a non-volatile memory 2234. The processor 2220 may include a main processor 2221 (a central processing unit, an application processor, etc.) and an auxiliary processor 2223 (a graphics processing unit, an image signal processor, a sensor hub processor, a communication processor, etc.) that may be operated independently or together with the main processor 2221. The auxiliary processor 2223 may use less power than the main processor 2221 and may perform a specialized function.

The auxiliary processor 2223 may control functions and/or states related to some of the components (e.g., the display device 2260, the sensor module 2210, the communication module 2290) of the electronic apparatus 2201 instead of the main processor 2221 while the main processor 2221 is in an inactive state (sleep state), or together with the main processor 2221 while the main processor 2221 is in an active state (application execution state). The auxiliary processor 2223 (an image signal processor, a communication processor, etc.) may be implemented as a part of other functionally related components (one or more of the camera module 2280, the communication module 2290, etc.).

The memory 2230 may store various data required or used by components of the electronic apparatus 2201 (one or more of the processor 2220, the sensor module 2276, etc.). The data may include, for example, input data and/or output data for software (such as the program 2240) and instructions related to the command. The memory 2230 may include a volatile memory 2232 and/or a non-volatile memory 2234. The non-volatile memory 2234 may include an internal memory 2236 and an external memory 2238. In some example embodiments, the non-volatile memory 2234 may include the SOT magnetic memory device according to the embodiment described above.

The program 2240 may be stored as software in the memory 2230, and may include an operating system 2242, middleware 2244, and/or an application 2246.

The input device 2250 may receive commands and/or data to be used in a component (e.g., the processor 2220) of the electronic apparatus 2201 from the outside of the electronic apparatus 2201 (e.g., a user). The input device 2250 may include one or more of a microphone, a mouse, a keyboard, and/or a digital pen (such as a stylus pen).

The sound output device 2255 may output a sound signal to the outside of the electronic apparatus 2201. The sound output device 2255 may include a speaker and/or a receiver. The speaker may be used for general purposes, such as multimedia playback or recording playback, and the receiver may be used to receive incoming calls. The receiver may be integrated or at least partly integrated as a part of the speaker or may be implemented as an independent separate device.

The display device 2260 may visually provide information to the outside of the electronic apparatus 2201. The display device 2260 may include a control circuit for controlling a display, a hologram device, or a projector and a corresponding device. The display device 2260 may include a touch circuitry configured to sense a touch, and/or a sensor circuitry configured to measure the intensity of force generated by the touch (e.g., a pressure sensor, etc.).

The audio module 2270 may convert a sound into an electric signal or, conversely, convert an electric signal into a sound. The audio module 2270 may obtain a sound through the input device 2250 or may output a sound through a speaker and/or headphone of the sound output device 2255 and/or another electronic apparatus (e.g., the electronic apparatus 2202) directly and/or wirelessly connected to electronic apparatus 2201.

The sensor module 2210 may detect an operating state (power, temperature, etc.) of the electronic apparatus 2201 or an external environmental state (user state, etc.), and may generate an electrical signal and/or data value corresponding to the sensed state. The sensor module 2210 may include a fingerprint sensor 2211, an acceleration sensor 2212, a position sensor 2213, a 3D sensor 2214, and the like, and in addition to the above sensors, may include an iris sensor, a gyro sensor, a barometric pressure sensor, a magnetic sensor, a grip sensor, a proximity sensor, a color sensor, an infrared (IR) sensor, a biometric sensor, a temperature sensor, a humidity sensor, and/or an illuminance sensor.

The 3D sensor 2214 may sense a shape and movement of an object by irradiating a predetermined light to the object and analyzing light reflected from the object, and may include a meta-optical device.

The interface 2277 may support one or more designated protocols that may be used by the electronic apparatus 2201 to connect directly or wirelessly with another electronic apparatus (e.g., the electronic apparatus 2202). The interface 2277 may include a High Definition Multimedia Interface (HDMI), a Universal Serial Bus (USB) interface, an SD card interface, and/or an audio interface.

The connection terminal 2278 may include a connector through which the electronic apparatus 2201 may be physically connected to another electronic apparatus (e.g., the electronic apparatus 2202). The connection terminal 2278 may include an HDMI connector, a USB connector, an SD card connector, and/or an audio connector (e.g., a headphone connector).

The haptic module 2279 may convert an electrical signal into a mechanical stimulus (vibration, movement, etc.) or an electrical stimulus that the user may perceive through tactile or kinesthetic sense. The haptic module 2279 may include a motor, a piezoelectric element, and/or an electrical stimulation device.

The camera module 2280 may capture still images and moving images. The camera module 2280 may include a lens assembly including one or more lenses, image sensors, image signal processors, and/or flashes. The lens assembly included in the camera module 2280 may collect light emitted from an object, which is an imaging target.

The power management module 2288 may manage power supplied to the electronic apparatus 2201. The power management module 2288 may be implemented as part of a Power Management Integrated Circuit (PMIC).

The battery 2289 may supply power to components of the electronic apparatus 2201. The battery 2289 may include a non-rechargeable primary cell, a rechargeable secondary cell, and/or a fuel cell.

The communication module 2290 establishes a direct (wired) communication channel and/or wireless communication channel between the electronic apparatus 2201 and other electronic apparatuses (the electronic apparatus 2202, an electronic apparatus 2204, server 2208, etc.) and performing communication through an established communication channel. The communication module 2290 may include one or more communication processors that operate independently of the processor 2220 (e.g., an application processor) and support direct communication and/or wireless communication. The communication module 2290 may include a wireless communication module 2292 (one or more of a cellular communication module, a short-range wireless communication module, a Global Navigation Satellite System (GNSS, etc.) communication module) and/or a wired communication module 2294 (one or more of a Local Area Network (LAN) communication module, or a power line communication module, etc.). Among these communication modules, a corresponding communication module may communicate with other electronic apparatuses through the first network 2298 (a short-range communication network, such as one or more f Bluetooth, WiFi Direct, or Infrared Data Association (IrDA)) or the second network 2299 (a telecommunication network, such as one or more of a cellular network, the Internet, or a computer network (LAN) and WAN, etc.). The various types of communication modules may be integrated into one component (a single chip, etc.) or implemented as a plurality of components (plural chips) separate from each other. The wireless communication module 2292 may identify and authenticate the electronic apparatus 2201 within a communication network, such as the first network 2298 and/or the second network 2299 by using subscriber information (such as, International Mobile Subscriber Identifier (IMSI)) stored in a subscriber identification module 2296.

The antenna module 2297 may transmit or receive signals and/or power to and from the outside (other electronic apparatuses, etc.). The antenna may include a radiator having a conductive pattern formed on a substrate (PCB, etc.). The antenna module 2297 may include one or a plurality of antennas. When a plurality of antennas is included in the antenna module 2297, an antenna suitable for a communication method used in a communication network, such as the first network 2298 and/or the second network 2299 from among the plurality of antennas may be selected by the communication module 2290. Signals and/or power may be transmitted or received between the communication module 2290 and another electronic apparatus through the selected antenna. In addition to the antenna, other components (an RFIC, etc.) may be included as a part of the antenna module 2297.

Some of the components are connected to each other through a communication method between peripheral devices (one or more of a bus, a General Purpose Input and Output (GPIO), a Serial Peripheral Interface (SPI), a Mobile Industry Processor Interface (MIPI), etc.), and may interchange signals (commands, data, etc.).

The command or data may be transmitted or received between the electronic apparatus 2201 and the external electronic apparatus 2204 through the server 2208 connected to the second network 2299. The other electronic apparatuses 2202 and 2204 may be the same or different types of electronic apparatus 2201. All or some of operations performed in the electronic apparatus 2201 may be performed in one or more of the other electronic apparatuses 2202, 2204, and 2208. For example, when the electronic apparatus 2201 needs to perform a function or service, the electronic apparatus 2201 may request one or more other electronic apparatuses to perform part or all function or service instead of executing the function or service itself. One or more other electronic apparatuses receiving the request may execute an additional function or service related to the request, and transmit a result of the execution to the electronic apparatus 2201. For this purpose, cloud computing, distributed computing, and/or client-server computing technologies may be used.

The disclosed SOT magnetic memory device includes two SOT-based material layers that cross each other. Among the two SOT-based material layers, a first SOT layer is in direct contact with the MTJ layer, and a second SOT layer forms a magnetic moment under the MTJ layer to generate a local magnetic field reaching a free layer of the MTJ.

Because the second SOT layer is provided, a magnetic moment may be formed under the MTJ layer before supplying a spin current to the free layer of the MTJ layer through the first SOT layer, thus, it is possible to ensure or more likely to ensure the same operation characteristics as those with an external magnetic field generating device even without a separate external magnetic field generating device.

Alternatively or additionally, the alignment direction of the magnetic moment formed under the MTJ layer by the second SOT layer may be controlled in consideration of recorded data. Therefore, in an SOT magnetic memory device including a plurality of memory cells, in an operation of writing data to a plurality of memory cells shared by the first SOT layer, data may be simultaneously written to the plurality of memory cells by applying a write current to the first SOT layer. Alternatively or additionally, because a write current applied to the first SOT layer does not exceed a permitted instantaneous power usage range, there is no problem in synchronizing an external electronic apparatus and the disclosed SOT magnetic memory device.

Alternatively or additionally, because a data write path and a read path are separated in an operation of the disclosed SOT magnetic memory device, high-speed switching characteristics of less than 1 nanosecond (<1 ns) and/or high endurance may be maintained.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

Furthermore, any or all of the components listed in the figures may communicate with any or all of the other components listed in the figures. For example, components may communicate wirelessly and/or in a wired manner, to engage in one-way and/or two-way and/or multi-way, such as broadcast communication, to send and/or receive data such as information and/or commands, in a serial manner and/or in a parallel manner. The data may be sent in an analog manner and/or in a digital manner. Example embodiments are not limited thereto.

It should be understood that various example embodiments described herein should be considered in a descriptive sense only and not for purposes of limitation. Descriptions of features and/or aspects within each embodiment should typically be considered as available for other similar features or aspects in other example embodiments, and example embodiments are not necessarily mutually exclusive with one another. While one or more embodiments have been described with reference to the figures, it will be understood by those of ordinary skill in the art that various changes in form and details may be made therein without departing from the spirit and scope as defined by the following claims.

What is claimed is:

1. A spin orbit torque (SOT) magnetic memory device comprising:
   a first SOT layer;
   a magnetic tunnel junction (MTJ) layer on one surface of the first SOT layer;
   an SOT-based local magnetic field generation layer crossing the first SOT layer and including a generating region configured to generate a magnetic field that reaches the MTJ layer; and
   an upper electrode layer facing the first SOT layer with the MTJ layer therebetween and being in contact with the MTJ layer,
   wherein the SOT magnetic memory device includes five operating terminals
   wherein the upper electrode layer is a line layer, and
   wherein the upper electrode layer and the first SOT layer cross from each other and the MTJ layer is at cross point of the upper electrode layer and the first SOT layer.

2. The SOT magnetic memory device of claim 1, wherein the SOT-based local magnetic field generation layer includes a first layer.

3. The SOT magnetic memory device of claim 2, wherein the first layer includes a magnetic SOT layer and/or a synthetic antiferromagnetic (SAF) layer.

4. The SOT magnetic memory device of claim 2, further comprising:
   a second layer between the first layer and the first SOT layer in the generating region.

5. The SOT magnetic memory device of claim 4, wherein the first layer includes at least one of a second SOT layer, a magnetic SOT layer, and a SAF layer, and
   the second layer includes at least one of a magnetic layer, an insulating layer, and a SAF layer.

6. The SOT magnetic memory device of claim 5, wherein the insulating layer includes an oxide.

7. The SOT magnetic memory device of claim 4, further comprising:
   a third layer between the second layer and the first SOT layer in the generating region.

8. The SOT magnetic memory device of claim 7, wherein the first layer includes a second SOT layer,
   the second layer includes a magnetic layer, and
   the third layer includes an insulating layer.

9. The SOT magnetic memory device of claim 1, wherein the first SOT layer, the MTJ layer, the SOT-based local magnetic field generation layer, and the upper electrode layer correspond to a memory cell,
   the SOT magnetic memory device includes a plurality of memory cells including the memory cell, and
   the first SOT layer is shared by the plurality of memory cells.

10. A display device including a display driver IC (DDI), the DDI comprising:
    a controller;
    a power supply circuit unit connected to the controller;
    a driver block connected to the power supply circuit unit and a memory block; and
    the memory block is connected to the controller, the power supply circuit unit, and the driver block,
    wherein the memory block comprises the spin orbit torque (SOT) magnetic memory device of claim 1.

11. An electronic system comprising:
    a memory controller;
    a memory device connected to the memory controller, the memory device including the spin orbit torque (SOT) magnetic memory device of claim 1; and a host system configured to communicate with the memory controller,
wherein the memory controller is configured to control the memory device to read data and write data to the memory device in response to a request from the host system.

12. An electronic apparatus comprising the spin orbit torque (SOT) magnetic memory device of claim 1.

13. An operating method of a spin orbit torque (SOT) magnetic memory device comprising a magnetic tunnel junction (MTJ) layer, the operating method comprising:
forming a magnetic moment aligned in a first direction in a generating region of a SOT-based material layer spaced apart from the MTJ layer, the generating region generating a magnetic field reaching a free layer of the MTJ layer; and
after forming the magnetic moment, supplying a spin current to the free layer of the MTJ layer in a state that the magnetic field is present,
wherein the SOT magnetic memory device further comprises:
a first SOT layer, the MTJ layer being on one surface of the first SOT layer; and
an upper electrode layer facing the first SOT layer with the MTJ layer therebetween and being in contact with the MTJ layer,
wherein the upper electrode layer is a line layer, and
wherein the upper electrode layer and the first SOT layer cross from each other and the MTJ layer is at cross point of the upper electrode layer and the first SOT layer.

14. The operating method of claim 13, further comprising:
after forming the magnetic moment by applying a first current to the SOT-based material layer, stopping application of the first current before supplying the spin current.

15. The operating method of claim 13, further comprising:
after completing the supplying of the spin current, measuring a resistance of the MTJ layer; and
comparing the measured resistance with a reference resistance.

16. The operating method of claim 13, wherein the SOT-based material layer includes a magnetic SOT layer or an SAF layer.

17. The operating method of claim 13, wherein the SOT-based material layer includes a first layer and a second layer sequentially stacked in the generating region, and
wherein the first layer includes at least one of a non-magnetic SOT layer, a magnetic SOT layer, and an SAF layer, and the second layer includes at least one of a magnetic layer, an insulating layer, and an SAF layer.

18. The operating method of claim 13, wherein the SOT-based material layer includes first to third layers sequentially stacked in the generating region, and
wherein the first layer includes a non-magnetic SOT layer, the second layer includes a magnetic layer, and the third layer includes an insulating layer.

19. The operating method of claim 13, further comprising:
after forming the magnetic moment by applying a first current to the SOT-based material layer, reducing application of the first current before supplying the spin current.

20. A method of manufacturing a spin orbit torque (SOT) magnetic memory device, the method comprising:
forming a first SOT layer;
forming a magnetic tunnel junction (MTJ) layer on one surface of the first SOT layer;
forming an SOT-based local magnetic field generation layer crossing the first SOT layer; and
forming an upper electrode layer facing the first SOT layer with the MTJ layer therebetween and being in contact with the MTJ layer and the first SOT layer,
wherein the upper electrode layer is a line layer, and
wherein the upper electrode layer and the first SOT layer cross from each other and the MTJ layer is at cross point of the upper electrode layer and the first SOT layer.

\* \* \* \* \*